(12) United States Patent
Scholl et al.

(10) Patent No.: US 10,544,692 B2
(45) Date of Patent: Jan. 28, 2020

(54) OPTIMIZED AERODYNAMIC PROFILE FOR A TURBINE VANE, IN PARTICULAR FOR A NOZZLE OF A TURBINE

(71) Applicant: Safran Aircraft Engines, Paris (FR)

(72) Inventors: Guillaume Jochen Scholl, Clamart (FR); Pierre Hervé Fernand Marche, Saint Serotin (FR); Thomas Michel Julien Mervant, Paris (FR); Ludovic Pintat, Cesson (FR); Renaud Gabriel Constant Royan, Sucy en Brie (FR)

(73) Assignee: Safran Aircraft Engines, Paris (FR)

( * ) Notice: Subject to any disclaimer, the term of this patent is extended or adjusted under 35 U.S.C. 154(b) by 72 days.

(21) Appl. No.: 15/976,062

(22) Filed: May 10, 2018

(65) Prior Publication Data

US 2018/0328202 A1     Nov. 15, 2018

Related U.S. Application Data

(60) Provisional application No. 62/504,555, filed on May 11, 2017.

(51) Int. Cl.
*F01D 9/04* (2006.01)

(52) U.S. Cl.
CPC ........ *F01D 9/041* (2013.01); *F05D 2220/323* (2013.01); *F05D 2240/128* (2013.01); *F05D 2250/74* (2013.01)

(58) Field of Classification Search
None
See application file for complete search history.

(56) References Cited

U.S. PATENT DOCUMENTS

| | | | |
|---|---|---|---|
| 2009/0068005 A1* | 3/2009 | Benjamin | F01D 9/041 415/208.1 |
| 2010/0158678 A1* | 6/2010 | Bielek | F01D 5/142 415/193 |
| 2010/0172752 A1* | 7/2010 | McGovern | F01D 9/041 415/208.1 |
| 2012/0020806 A1* | 1/2012 | Girard | F01D 5/141 416/241 R |
| 2012/0057982 A1* | 3/2012 | O'Hearn | F01D 5/141 416/223 A |
| 2012/0063908 A1* | 3/2012 | Islam | F01D 5/141 416/223 A |
| 2012/0224954 A1* | 9/2012 | Baer | F04D 29/324 415/208.1 |
| 2013/0039771 A1* | 2/2013 | Check | F01D 5/141 416/223 A |

(Continued)

*Primary Examiner* — Carlos A Rivera
*Assistant Examiner* — Theodore C Ribadeneyra
(74) *Attorney, Agent, or Firm* — Bookoff McAndrews, PLLC

(57) ABSTRACT

When cold and in the non-coated state, the aerodynamic profile is substantially identical to a nominal profile determined by the Cartesian coordinates X,Y, Zadim given in Table 1, in which the coordinate Zadim is the quotient D/H where D is the distance of the point under consideration from a first reference plane P0 situated at the base of the nominal profile, and H is the height of said profile measured from the first reference plane to a second reference plane P1. The measurements D and H are taken radially relative to the axis of the turbine, while the X coordinate is measured in the axial direction of the turbine.

14 Claims, 2 Drawing Sheets

(56) References Cited

U.S. PATENT DOCUMENTS

| | | | |
|---|---|---|---|
| 2013/0089415 A1* | 4/2013 | Brown | F01D 5/141 415/193 |
| 2013/0136589 A1* | 5/2013 | Gustafson | F01D 5/141 415/202 |
| 2013/0164116 A1* | 6/2013 | Tardif | F01D 9/041 415/115 |
| 2015/0110618 A1* | 4/2015 | Stein | F01D 9/041 415/208.2 |
| 2018/0016925 A1* | 1/2018 | Man | F01D 9/041 |
| 2019/0063242 A1* | 2/2019 | Tsifourdaris | F01D 9/041 |

* cited by examiner

OPTIMIZED AERODYNAMIC PROFILE FOR A TURBINE VANE, IN PARTICULAR FOR A NOZZLE OF A TURBINE

CROSS-REFERENCE TO RELATED APPLICATION

This application claims the benefit of priority to U.S. Patent Application No. 62/504,555, filed on May 11, 2017, the entirety of which is incorporated by reference herein.

INTRODUCTION

The present disclosure relates to an aerodynamic profile for a turbine vane.

In particular, the disclosure relates to the aerodynamic profile of a nozzle vane forming a portion of the stator of a gas turbine, and more particularly of a low pressure turbine of the type used in a turbojet of an aircraft.

The disclosure relates in particular to a nozzle vane of a turbine having a plurality of stages, preferably five stages.

Such a profile should enable the turbine to provide the desired efficiency, and in order to do that it must be such that the flow of air around the profile is sound over the working spectrum of the turbine, i.e. substantially such that it does not give rise to turbulence, which is harmful for overall efficiency.

It must be capable of being installed properly in the environment of the engine, and in particular, for a nozzle vane forming a portion of the stator of the turbine, it must be capable of being fastened easily to the sectors of the foot platform (the zone of the vane that is furthest from the axis of rotation of the turbine) and of the head platform (the zone that is closest to said axis). Furthermore, this part must present a profile enabling it to be manufactured in a reliable and cost-effective manner by available manufacturing methods, such as casting, forging, machining, additive fabrication, or else weaving, without this list being limitative.

Furthermore, the profile of the vane must enable it to withstand the mechanical stresses, to which the vane is subjected, by enabling those stresses to be spread over the entire vane in such a manner as to avoid premature wear thereof. This spreading must apply both in static mode and in dynamic mode.

An object of the disclosure is to propose an aerodynamic profile for a turbine vane that is optimized, and capable of satisfying those objectives.

This object is achieved by the fact that when cold and in a non-coated state, said profile is substantially identical to a nominal profile determined by the Cartesian coordinates X,Y,Zadim given in Table 1, in which the coordinate Zadim is the quotient D/H where D is the distance of the point P under consideration from a reference X,Y plane situated at the base of the nominal profile, and H is the height of said profile measured from said reference plane that is the intersection of the stacking axis of the vane and the axisymmetric surface of the hub, out to a second reference plane that is the intersection of said stacking axis with the axisymmetric surface of the casing, the measurements D and H being taken radially relative to the axis of the turbine, while the coordinate X is measured in the axial direction of the turbine.

This profile has been determined as a result of numerous tests and simulations. It is defined cold, i.e. at an ambient temperature of 20° C. That is a reference temperature at which the profile is geometrically determined. The above-mentioned objectives of aerodynamics and mechanical optimization are naturally valid for the conditions of use of this aerodynamic profile, i.e. when hot, at a temperature that is stabilized when the engine of which the turbine forms a part is being used under cruising conditions.

Furthermore, the aerodynamic profile of the disclosure is defined in the non-coated state. Since turbine vanes are subjected to high temperature gradients, it is common practice for them to be provided with a coating having thermal properties enabling them more easily to withstand such temperature variations. The profile is determined prior to installing such a coating.

It is stated above that the profile of the disclosure is "substantially identical" to the nominal profile. This means that the profile may depart very slightly from said nominal profile.

The aerodynamic profile is thus preferably defined within an envelope of ±1 millimeter (mm) in a direction normal to the surface of the nominal profile.

It is also preferable for the X,Y coordinates of the aerodynamic profile to lie within a range of ±5% relative to the X,Y coordinates of the nominal profile.

In addition, the aerodynamic profile may be positioned rotated within ±10°, particularly within ±5°, more particularly within ±3°, with respect to the radial axis of the vane, along which the coordinate Zadim is measured.

These variations take account in particular to at least one of manufacturing tolerances of the profile, the setting of the profile to adapt to the environment when in operation, and possible deformation occurring when mounting the vane and integrating the same in the nozzle.

With a nozzle vane, i.e. a portion of the stator of a turbine, the profile serves to orient the fluid correctly for the turbine blades that are situated downstream, and that belong in particular to the rotary wheel of the same stage of the turbine.

BRIEF DESCRIPTION OF THE DRAWINGS

The disclosure can be better understood and its advantages appear better on reading the following detailed description of an embodiment given by way of non-limiting example. The description refers to the accompanying drawings, in which.

DETAILED DESCRIPTION

Figure 1:
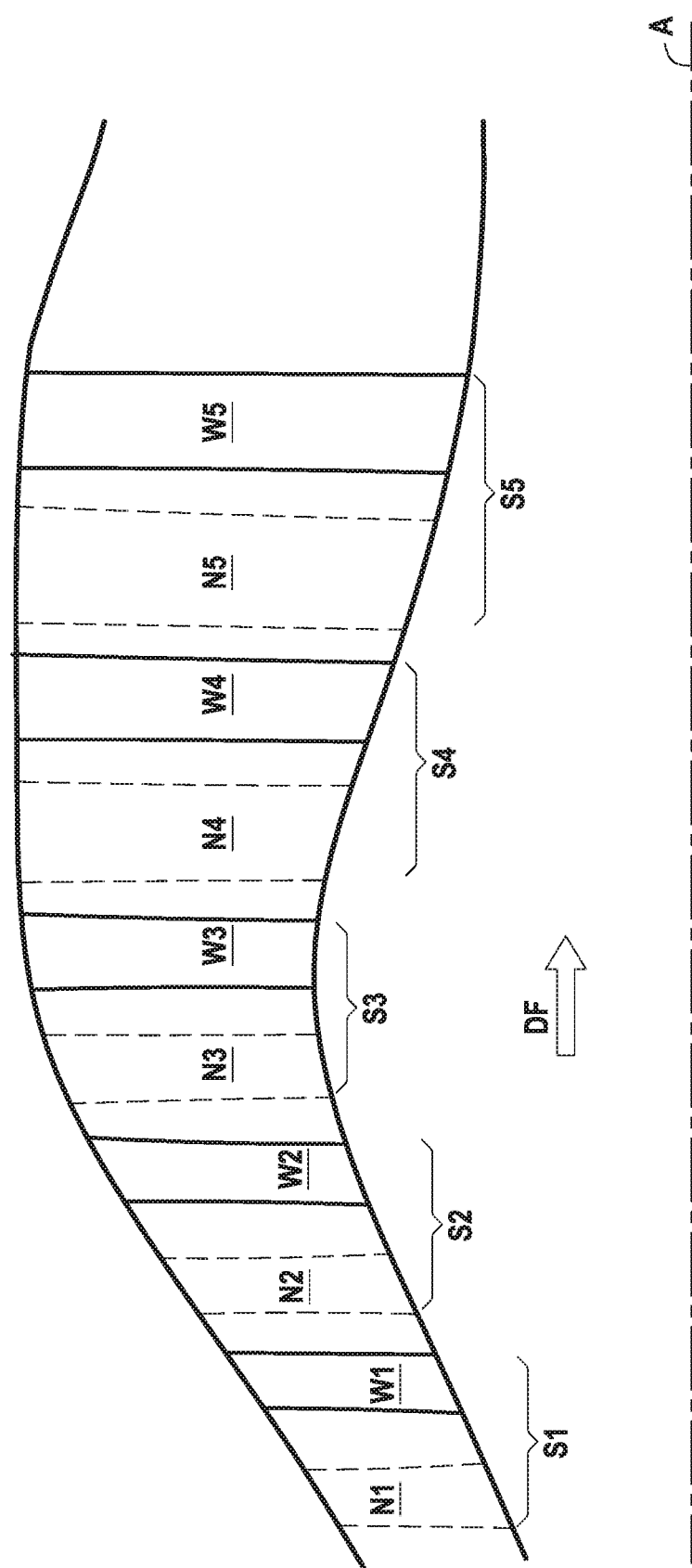
FIG. 1 is a fragmentary axial diagrammatic section view of a turbine including a vane of profile that corresponds to that of the present disclosure.

The turbine shown in axial section in FIG. 1 comprises five stages referenced respectively S1 to S5. In the direction DF going from upstream to downstream, each stage comprises a nozzle that forms a portion of the stator of the turbine and that has a plurality of radially-oriented vanes, and a rotary wheel that forms a portion of the rotor of the turbine and that likewise includes a plurality of radially-oriented blades.

In FIG. 1, the vanes of the nozzles of stages S1 to S5 are given references N1 to N5 (these vanes are shown in dashed lines, for ease of representation), whereas the blades of rotary wheels of stages S1 to S5 are given respective references W1 to W5.

In known manner, the vanes of the nozzles are fastened at both ends to stationary structure portions, while the blades of the rotary wheels are fastened to a rotary disk via their roots that are formed at their radially-inner ends closer to the axis of the rotation A of the turbine. The disks forming parts of the wheels W1 to W5 are constrained to rotate together.

The disclosure relates a vane of one of the nozzles of the turbine that, as mentioned above, preferably comprises five stages as shown, without this number being limiting.

Figure 2:
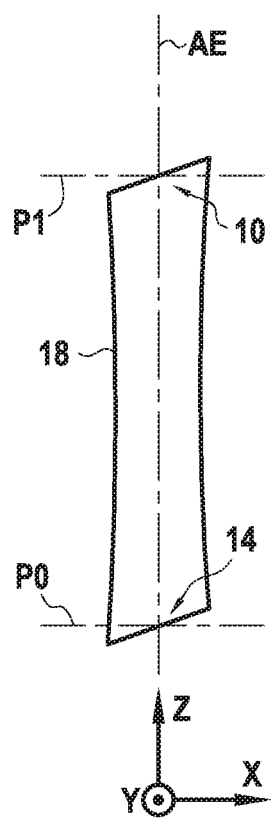
FIG. 2 shows a vane of the turbine.

As best seen in FIG. 2, via its foot 10, which is its end remote from the axis of rotation A, the vane is fastened to the outer ring of the turbine, which ring is stationary in rotation. Via its head 14, formed by its end closer to the axis of rotation A, the vane is fastened to an inner shroud of the turbine. By convention, the aerodynamic profile 18 of the vane is the entire portion of said vane that extends radially outwards from its head 14 to its foot 10 without incorporating the fastenings respectively to the outer ring and to the inner shroud.

In FIG. 2, there can be seen a frame of reference comprising Cartesian coordinates X,Y,Z. The radial direction Z is the height direction of the vane, which extends radially from its head to its foot. This direction Z is perpendicular to the axial direction X which is the direction of the axis of rotation A of the turbine. The direction Y is perpendicular to the X,Z plane and is therefore tangential to the direction of rotation of the turbine.

The nominal profile from which the aerodynamic profile of the disclosure is determined is defined in following Table 1 of coordinates, in which the coordinate Zadim, measured along the axis Z is non-dimensional, whereas the dimensions X and Y, respectively measured along the axes X and Y, are expressed in millimeters.

TABLE 1

| X | Y | Zadim |
|---|---|---|
| −9.5839 | 1.645034 | −0.15001 |
| −9.59598 | 1.589313 | −0.15001 |
| −9.60652 | 1.511004 | −0.15001 |
| −9.61338 | 1.396335 | −0.15001 |
| −9.60916 | 1.238254 | −0.15001 |
| −9.57983 | 1.030729 | −0.15001 |
| −9.5049 | 0.773888 | −0.15001 |
| −9.36183 | 0.477387 | −0.15001 |
| −9.13411 | 0.159274 | −0.15001 |
| −8.82452 | −0.16962 | −0.15001 |
| −8.4383 | −0.50389 | −0.15001 |
| −7.9754 | −0.83437 | −0.15001 |
| −7.43501 | −1.14891 | −0.15001 |
| −6.81645 | −1.4305 | −0.15001 |
| −6.12208 | −1.65982 | −0.15001 |
| −5.35873 | −1.81567 | −0.15001 |
| −4.53862 | −1.87793 | −0.15001 |
| −3.67949 | −1.82872 | −0.15001 |
| −2.80164 | −1.65516 | −0.15001 |
| −1.9286 | −1.35529 | −0.15001 |
| −1.07914 | −0.93538 | −0.15001 |
| −0.26761 | −0.40739 | −0.15001 |
| 0.497644 | 0.212281 | −0.15001 |
| 1.212444 | 0.907124 | −0.15001 |
| 1.875688 | 1.660956 | −0.15001 |
| 2.489151 | 2.458009 | −0.15001 |
| 3.056167 | 3.283933 | −0.15001 |
| 3.582129 | 4.125161 | −0.15001 |
| 4.070232 | 4.971248 | −0.15001 |
| 4.521753 | 5.813917 | −0.15001 |
| 4.94068 | 6.644155 | −0.15001 |
| 5.331095 | 7.453775 | −0.15001 |
| 5.694305 | 8.236638 | −0.15001 |
| 6.030805 | 8.987528 | −0.15001 |
| 6.342829 | 9.70094 | −0.15001 |
| 6.631382 | 10.37249 | −0.15001 |
| 6.896441 | 10.99879 | −0.15001 |
| 7.138259 | 11.57691 | −0.15001 |
| 7.357444 | 12.10441 | −0.15001 |
| 7.553943 | 12.57973 | −0.15001 |

TABLE 1-continued

| X | Y | Zadim |
|---|---|---|
| 7.727732 | 13.00205 | −0.15001 |
| 7.879223 | 13.37111 | −0.15001 |
| 8.008862 | 13.68743 | −0.15001 |
| 8.117302 | 13.95227 | −0.15001 |
| 8.205454 | 14.16772 | −0.15001 |
| 8.27312 | 14.33738 | −0.15001 |
| 8.270783 | 14.47239 | −0.15001 |
| 8.226619 | 14.55616 | −0.15001 |
| 8.184018 | 14.59771 | −0.15001 |
| 8.145323 | 14.62163 | −0.15001 |
| 8.114813 | 14.63447 | −0.15001 |
| 8.072877 | 14.64476 | −0.15001 |
| 8.00426 | 14.64628 | −0.15001 |
| 7.907352 | 14.61685 | −0.15001 |
| 7.829071 | 14.51035 | −0.15001 |
| 7.752344 | 14.35935 | −0.15001 |
| 7.658885 | 14.17321 | −0.15001 |
| 7.546969 | 13.95094 | −0.15001 |
| 7.415913 | 13.69169 | −0.15001 |
| 7.265288 | 13.39509 | −0.15001 |
| 7.09499 | 13.06119 | −0.15001 |
| 6.902191 | 12.69211 | −0.15001 |
| 6.678154 | 12.29385 | −0.15001 |
| 6.413552 | 11.87331 | −0.15001 |
| 6.103207 | 11.43646 | −0.15001 |
| 5.745373 | 10.98811 | −0.15001 |
| 5.340396 | 10.5323 | −0.15001 |
| 4.889814 | 10.07286 | −0.15001 |
| 4.395703 | 9.613708 | −0.15001 |
| 3.86139 | 9.158171 | −0.15001 |
| 3.290874 | 8.709701 | −0.15001 |
| 2.689107 | 8.270893 | −0.15001 |
| 2.061575 | 7.844907 | −0.15001 |
| 1.413965 | 7.433854 | −0.15001 |
| 0.752777 | 7.039262 | −0.15001 |
| 0.084802 | 6.662034 | −0.15001 |
| −0.58566 | 6.306489 | −0.15001 |
| −1.25587 | 5.97872 | −0.15001 |
| −1.92456 | 5.688206 | −0.15001 |
| −2.58804 | 5.440664 | −0.15001 |
| −3.24139 | 5.237669 | −0.15001 |
| −3.87984 | 5.072355 | −0.15001 |
| −4.49958 | 4.931448 | −0.15001 |
| −5.09928 | 4.794919 | −0.15001 |
| −5.67943 | 4.644155 | −0.15001 |
| −6.24007 | 4.460894 | −0.15001 |
| −6.77627 | 4.236557 | −0.15001 |
| −7.28237 | 3.975456 | −0.15001 |
| −7.74922 | 3.686103 | −0.15001 |
| −8.16917 | 3.379806 | −0.15001 |
| −8.53694 | 3.06946 | −0.15001 |
| −8.84986 | 2.767144 | −0.15001 |
| −9.10516 | 2.481738 | −0.15001 |
| −9.29901 | 2.22313 | −0.15001 |
| −9.43046 | 2.006613 | −0.15001 |
| −9.50694 | 1.850771 | −0.15001 |
| −9.5473 | 1.752576 | −0.15001 |
| −9.44092 | 2.198932 | −0.075 |
| −9.46805 | 2.151808 | −0.075 |
| −9.49987 | 2.08036 | −0.075 |
| −9.53627 | 1.964925 | −0.075 |
| −9.56321 | 1.79494 | −0.075 |
| −9.55607 | 1.564893 | −0.075 |
| −9.48481 | 1.283283 | −0.075 |
| −9.33114 | 0.970038 | −0.075 |
| −9.0911 | 0.644384 | −0.075 |
| −8.78244 | 0.303388 | −0.075 |
| −8.40714 | −0.05181 | −0.075 |
| −7.96257 | −0.41441 | −0.075 |
| −7.44366 | −0.77055 | −0.075 |
| −6.8466 | −1.10232 | −0.075 |
| −6.17069 | −1.38878 | −0.075 |
| −5.41984 | −1.60679 | −0.075 |
| −4.60374 | −1.73297 | −0.075 |
| −3.73839 | −1.74581 | −0.075 |
| −2.84394 | −1.62946 | −0.075 |
| −1.94525 | −1.37634 | −0.075 |
| −1.06459 | −0.99053 | −0.075 |

TABLE 1-continued

| X | Y | Zadim |
|---|---|---|
| −0.21961 | −0.48468 | −0.075 |
| 0.579094 | 0.12252 | −0.075 |
| 1.326266 | 0.811851 | −0.075 |
| 2.020646 | 1.564836 | −0.075 |
| 2.664164 | 2.364097 | −0.075 |
| 3.260436 | 3.194166 | −0.075 |
| 3.814421 | 4.041113 | −0.075 |
| 4.329551 | 4.893886 | −0.075 |
| 4.807592 | 5.743642 | −0.075 |
| 5.2524 | 6.581166 | −0.075 |
| 5.66753 | 7.398274 | −0.075 |
| 6.054442 | 8.188573 | −0.075 |
| 6.413748 | 8.946647 | −0.075 |
| 6.74731 | 9.666991 | −0.075 |
| 7.056003 | 10.34515 | −0.075 |
| 7.339836 | 10.97763 | −0.075 |
| 7.598978 | 11.56148 | −0.075 |
| 7.833863 | 12.09422 | −0.075 |
| 8.044455 | 12.5743 | −0.075 |
| 8.230769 | 13.00083 | −0.075 |
| 8.39317 | 13.37357 | −0.075 |
| 8.532134 | 13.69305 | −0.075 |
| 8.648359 | 13.96053 | −0.075 |
| 8.742834 | 14.17815 | −0.075 |
| 8.815592 | 14.34944 | −0.075 |
| 8.82003 | 14.48699 | −0.075 |
| 8.778251 | 14.57394 | −0.075 |
| 8.736056 | 14.61744 | −0.075 |
| 8.697184 | 14.64261 | −0.075 |
| 8.66491 | 14.6565 | −0.075 |
| 8.620416 | 14.6671 | −0.075 |
| 8.548132 | 14.66632 | −0.075 |
| 8.450075 | 14.62857 | −0.075 |
| 8.368454 | 14.51425 | −0.075 |
| 8.283007 | 14.35559 | −0.075 |
| 8.178644 | 14.16008 | −0.075 |
| 8.053772 | 13.92659 | −0.075 |
| 7.907698 | 13.65417 | −0.075 |
| 7.740005 | 13.34242 | −0.075 |
| 7.550577 | 12.99141 | −0.075 |
| 7.336941 | 12.60314 | −0.075 |
| 7.09254 | 12.18274 | −0.075 |
| 6.811548 | 11.73554 | −0.075 |
| 6.489949 | 11.26677 | −0.075 |
| 6.125511 | 10.78151 | −0.075 |
| 5.719145 | 10.28334 | −0.075 |
| 5.272398 | 9.775835 | −0.075 |
| 4.786819 | 9.263053 | −0.075 |
| 4.264689 | 8.74895 | −0.075 |
| 3.709297 | 8.237033 | −0.075 |
| 3.124032 | 7.731063 | −0.075 |
| 2.512913 | 7.234749 | −0.075 |
| 1.880085 | 6.751475 | −0.075 |
| 1.230005 | 6.284604 | −0.075 |
| 0.566908 | 5.838048 | −0.075 |
| −0.106 | 5.417298 | −0.075 |
| −0.78688 | 5.030658 | −0.075 |
| −1.47409 | 4.688656 | −0.075 |
| −2.16404 | 4.401174 | −0.075 |
| −2.85083 | 4.17489 | −0.075 |
| −3.5267 | 4.007105 | −0.075 |
| −4.18393 | 3.887296 | −0.075 |
| −4.81705 | 3.800177 | −0.075 |
| −5.42238 | 3.727296 | −0.075 |
| −5.99754 | 3.652345 | −0.075 |
| −6.53912 | 3.565624 | −0.075 |
| −7.04344 | 3.462137 | −0.075 |
| −7.50591 | 3.341352 | −0.075 |
| −7.9225 | 3.2058 | −0.075 |
| −8.28948 | 3.059321 | −0.075 |
| −8.60321 | 2.905208 | −0.075 |
| −8.86156 | 2.749173 | −0.075 |
| −9.06368 | 2.599004 | −0.075 |
| −9.2118 | 2.466212 | −0.075 |
| −9.31214 | 2.361104 | −0.075 |
| −9.3765 | 2.285137 | −0.075 |
| −9.22394 | 2.908108 | 0 |
| −9.26228 | 2.86814 | 0 |
| −9.30676 | 2.801029 | 0 |
| −9.34969 | 2.684469 | 0 |
| −9.36753 | 2.512301 | 0 |
| −9.34316 | 2.287609 | 0 |
| −9.26762 | 2.01569 | 0 |
| −9.13507 | 1.70191 | 0 |
| −8.94082 | 1.351693 | 0 |
| −8.68034 | 0.971396 | 0 |
| −8.34894 | 0.568973 | 0 |
| −7.94186 | 0.154647 | 0 |
| −7.45481 | −0.25883 | 0 |
| −6.88398 | −0.65502 | 0 |
| −6.22725 | −1.01341 | 0 |
| −5.48594 | −1.30959 | 0 |
| −4.66675 | −1.51579 | 0 |
| −3.78445 | −1.60442 | 0 |
| −2.8604 | −1.55291 | 0 |
| −1.92388 | −1.35042 | 0 |
| −1.00183 | −1.00067 | 0 |
| −0.11527 | −0.51912 | 0 |
| 0.723517 | 0.072146 | 0 |
| 1.509004 | 0.750641 | 0 |
| 2.240443 | 1.495529 | 0 |
| 2.92036 | 2.288056 | 0 |
| 3.552855 | 3.111989 | 0 |
| 4.142465 | 3.953474 | 0 |
| 4.692619 | 4.801266 | 0 |
| 5.205532 | 5.646103 | 0 |
| 5.684875 | 6.47875 | 0 |
| 6.133467 | 7.291286 | 0 |
| 6.552697 | 8.077231 | 0 |
| 6.943235 | 8.831038 | 0 |
| 7.306492 | 9.54732 | 0 |
| 7.643074 | 10.22166 | 0 |
| 7.952942 | 10.85054 | 0 |
| 8.236142 | 11.431 | 0 |
| 8.492902 | 11.96063 | 0 |
| 8.723158 | 12.43788 | 0 |
| 8.926936 | 12.86186 | 0 |
| 9.104567 | 13.23234 | 0 |
| 9.256548 | 13.54987 | 0 |
| 9.383657 | 13.81571 | 0 |
| 9.486967 | 14.03197 | 0 |
| 9.56683 | 14.20207 | 0 |
| 9.580384 | 14.34175 | 0 |
| 9.542809 | 14.43221 | 0 |
| 9.501813 | 14.47853 | 0 |
| 9.46297 | 14.50583 | 0 |
| 9.428693 | 14.5216 | 0 |
| 9.381033 | 14.53341 | 0 |
| 9.303163 | 14.53096 | 0 |
| 9.202399 | 14.4833 | 0 |
| 9.116082 | 14.36181 | 0 |
| 9.019387 | 14.19777 | 0 |
| 8.901022 | 13.99576 | 0 |
| 8.759525 | 13.7545 | 0 |
| 8.594179 | 13.47302 | 0 |
| 8.404603 | 13.1509 | 0 |
| 8.190687 | 12.78828 | 0 |
| 7.950624 | 12.38695 | 0 |
| 7.680095 | 11.95094 | 0 |
| 7.374958 | 11.48499 | 0 |
| 7.032993 | 10.99343 | 0 |
| 6.653259 | 10.48061 | 0 |
| 6.236594 | 9.95014 | 0 |
| 5.784504 | 9.405592 | 0 |
| 5.298463 | 8.850977 | 0 |
| 4.78038 | 8.290326 | 0 |
| 4.232551 | 7.727682 | 0 |
| 3.657589 | 7.167097 | 0 |
| 3.058017 | 6.613001 | 0 |
| 2.43649 | 6.069983 | 0 |
| 1.79583 | 5.542739 | 0 |
| 1.138914 | 5.036189 | 0 |
| 0.467122 | 4.557712 | 0 |
| −0.21843 | 4.116171 | 0 |
| −0.91679 | 3.722561 | 0 |
| −1.6258 | 3.389072 | 0 |

TABLE 1-continued

| X | Y | Zadim |
|---|---|---|
| −2.34083 | 3.127967 | 0 |
| −3.05233 | 2.944062 | 0 |
| −3.74881 | 2.835936 | 0 |
| −4.41881 | 2.794821 | 0 |
| −5.05297 | 2.805532 | 0 |
| −5.6456 | 2.850652 | 0 |
| −6.19418 | 2.913175 | 0 |
| −6.69744 | 2.979516 | 0 |
| −7.15505 | 3.039384 | 0 |
| −7.56664 | 3.085707 | 0 |
| −7.93174 | 3.115204 | 0 |
| −8.24975 | 3.12616 | 0 |
| −8.52036 | 3.119678 | 0 |
| −8.74356 | 3.097554 | 0 |
| −8.91977 | 3.06256 | 0 |
| −9.05001 | 3.018395 | 0 |
| −9.13739 | 2.972479 | 0 |
| −9.21948 | 2.881951 | 0.1 |
| −9.26016 | 2.842624 | 0.1 |
| −9.30656 | 2.774701 | 0.1 |
| −9.34834 | 2.654886 | 0.1 |
| −9.36101 | 2.478481 | 0.1 |
| −9.3292 | 2.249824 | 0.1 |
| −9.24559 | 1.973867 | 0.1 |
| −9.10545 | 1.655334 | 0.1 |
| −8.9044 | 1.299003 | 0.1 |
| −8.6379 | 0.910738 | 0.1 |
| −8.30123 | 0.498062 | 0.1 |
| −7.88969 | 0.070545 | 0.1 |
| −7.39715 | −0.35777 | 0.1 |
| −6.8197 | −0.7707 | 0.1 |
| −6.15457 | −1.14734 | 0.1 |
| −5.40176 | −1.46121 | 0.1 |
| −4.56711 | −1.6815 | 0.1 |
| −3.66677 | −1.77641 | 0.1 |
| −2.72296 | −1.71934 | 0.1 |
| −1.76912 | −1.49711 | 0.1 |
| −0.83685 | −1.1154 | 0.1 |
| 0.051548 | −0.59301 | 0.1 |
| 0.88365 | 0.044603 | 0.1 |
| 1.655144 | 0.771967 | 0.1 |
| 2.366915 | 1.566169 | 0.1 |
| 3.023125 | 2.407213 | 0.1 |
| 3.629457 | 3.278066 | 0.1 |
| 4.190992 | 4.16493 | 0.1 |
| 4.712062 | 5.056295 | 0.1 |
| 5.196071 | 5.942437 | 0.1 |
| 5.646955 | 6.814279 | 0.1 |
| 6.067343 | 7.664202 | 0.1 |
| 6.459253 | 8.485512 | 0.1 |
| 6.823824 | 9.272487 | 0.1 |
| 7.162323 | 10.0199 | 0.1 |
| 7.47549 | 10.7233 | 0.1 |
| 7.76357 | 11.37904 | 0.1 |
| 8.02668 | 11.98413 | 0.1 |
| 8.264992 | 12.53621 | 0.1 |
| 8.478563 | 13.03364 | 0.1 |
| 8.667586 | 13.47549 | 0.1 |
| 8.832348 | 13.86155 | 0.1 |
| 8.973215 | 14.19244 | 0.1 |
| 9.090955 | 14.4695 | 0.1 |
| 9.186606 | 14.6949 | 0.1 |
| 9.260391 | 14.87213 | 0.1 |
| 9.272551 | 15.01502 | 0.1 |
| 9.231585 | 15.10636 | 0.1 |
| 9.187885 | 15.15199 | 0.1 |
| 9.146924 | 15.17796 | 0.1 |
| 9.109041 | 15.19272 | 0.1 |
| 9.05687 | 15.20155 | 0.1 |
| 8.97365 | 15.19003 | 0.1 |
| 8.874402 | 15.1228 | 0.1 |
| 8.791659 | 14.98496 | 0.1 |
| 8.694559 | 14.80419 | 0.1 |
| 8.57551 | 14.58175 | 0.1 |
| 8.433294 | 14.31601 | 0.1 |
| 8.267264 | 14.00588 | 0.1 |
| 8.077092 | 13.65084 | 0.1 |
| 7.862681 | 13.25102 | 0.1 |
| 7.623279 | 12.80757 | 0.1 |
| 7.356246 | 12.32334 | 0.1 |
| 7.061449 | 11.80046 | 0.1 |
| 6.738525 | 11.24179 | 0.1 |
| 6.38759 | 10.65045 | 0.1 |
| 6.008461 | 10.03028 | 0.1 |
| 5.601238 | 9.385431 | 0.1 |
| 5.166699 | 8.720094 | 0.1 |
| 4.705229 | 8.039124 | 0.1 |
| 4.217194 | 7.347816 | 0.1 |
| 3.703101 | 6.651767 | 0.1 |
| 3.162441 | 5.957777 | 0.1 |
| 2.595457 | 5.272596 | 0.1 |
| 2.002517 | 4.603418 | 0.1 |
| 1.382805 | 3.959242 | 0.1 |
| 0.735727 | 3.350027 | 0.1 |
| 0.059841 | 2.788514 | 0.1 |
| −0.64497 | 2.289047 | 0.1 |
| −1.37676 | 1.867998 | 0.1 |
| −2.12893 | 1.541057 | 0.1 |
| −2.88928 | 1.320169 | 0.1 |
| −3.64121 | 1.209845 | 0.1 |
| −4.36394 | 1.204043 | 0.1 |
| −5.04167 | 1.28847 | 0.1 |
| −5.66366 | 1.442167 | 0.1 |
| −6.22421 | 1.641682 | 0.1 |
| −6.7241 | 1.863902 | 0.1 |
| −7.16724 | 2.089666 | 0.1 |
| −7.55839 | 2.304636 | 0.1 |
| −7.90201 | 2.498779 | 0.1 |
| −8.20214 | 2.664611 | 0.1 |
| −8.46154 | 2.797948 | 0.1 |
| −8.68292 | 2.894674 | 0.1 |
| −8.86781 | 2.951849 | 0.1 |
| −9.01557 | 2.963489 | 0.1 |
| −9.1193 | 2.940505 | 0.1 |
| −9.19971 | 2.927162 | 0.2 |
| −9.24259 | 2.888696 | 0.2 |
| −9.29129 | 2.820582 | 0.2 |
| −9.33405 | 2.698663 | 0.2 |
| −9.34543 | 2.518906 | 0.2 |
| −9.3109 | 2.286479 | 0.2 |
| −9.22409 | 2.006004 | 0.2 |
| −9.081 | 1.681883 | 0.2 |
| −8.87737 | 1.318505 | 0.2 |
| −8.60857 | 0.921502 | 0.2 |
| −8.26961 | 0.498293 | 0.2 |
| −7.85516 | 0.058717 | 0.2 |
| −7.35984 | −0.38429 | 0.2 |
| −6.77864 | −0.81387 | 0.2 |
| −6.1078 | −1.20828 | 0.2 |
| −5.34649 | −1.53984 | 0.2 |
| −4.4998 | −1.77537 | 0.2 |
| −3.58395 | −1.87973 | 0.2 |
| −2.6231 | −1.82308 | 0.2 |
| −1.65328 | −1.59091 | 0.2 |
| −0.70914 | −1.19035 | 0.2 |
| 0.186051 | −0.64311 | 0.2 |
| 1.020412 | 0.022368 | 0.2 |
| 1.790748 | 0.778598 | 0.2 |
| 2.498915 | 1.601619 | 0.2 |
| 3.150679 | 2.470372 | 0.2 |
| 3.754823 | 3.36601 | 0.2 |
| 4.312457 | 4.277672 | 0.2 |
| 4.829186 | 5.193072 | 0.2 |
| 5.309165 | 6.102114 | 0.2 |
| 5.75627 | 6.995801 | 0.2 |
| 6.172755 | 7.866699 | 0.2 |
| 6.560966 | 8.707929 | 0.2 |
| 6.922274 | 9.513638 | 0.2 |
| 7.257653 | 10.27869 | 0.2 |
| 7.567829 | 10.99861 | 0.2 |
| 7.853166 | 11.66965 | 0.2 |
| 8.113759 | 12.28881 | 0.2 |
| 8.349738 | 12.85369 | 0.2 |
| 8.561231 | 13.36263 | 0.2 |
| 8.748377 | 13.8147 | 0.2 |
| 8.911337 | 14.20975 | 0.2 |

TABLE 1-continued

| X | Y | Zadim |
|---|---|---|
| 9.05054 | 14.54839 | 0.2 |
| 9.166987 | 14.8319 | 0.2 |
| 9.261613 | 15.06251 | 0.2 |
| 9.335357 | 15.24352 | 0.2 |
| 9.349184 | 15.38891 | 0.2 |
| 9.3077 | 15.48203 | 0.2 |
| 9.263029 | 15.52831 | 0.2 |
| 9.221061 | 15.55433 | 0.2 |
| 9.181165 | 15.56905 | 0.2 |
| 9.126346 | 15.5767 | 0.2 |
| 9.039962 | 15.56058 | 0.2 |
| 8.940959 | 15.48354 | 0.2 |
| 8.858474 | 15.33689 | 0.2 |
| 8.758704 | 15.14685 | 0.2 |
| 8.636132 | 14.91315 | 0.2 |
| 8.489801 | 14.63391 | 0.2 |
| 8.319103 | 14.30795 | 0.2 |
| 8.123763 | 13.93469 | 0.2 |
| 7.903625 | 13.51429 | 0.2 |
| 7.65898 | 13.04738 | 0.2 |
| 7.389626 | 12.53552 | 0.2 |
| 7.095478 | 11.98083 | 0.2 |
| 6.776539 | 11.38597 | 0.2 |
| 6.433136 | 10.75399 | 0.2 |
| 6.065831 | 10.0883 | 0.2 |
| 5.674633 | 9.393066 | 0.2 |
| 5.259517 | 8.672937 | 0.2 |
| 4.819667 | 7.933431 | 0.2 |
| 4.354064 | 7.180661 | 0.2 |
| 3.862126 | 6.420915 | 0.2 |
| 3.341622 | 5.662092 | 0.2 |
| 2.790527 | 4.91267 | 0.2 |
| 2.207093 | 4.181817 | 0.2 |
| 1.589239 | 3.480126 | 0.2 |
| 0.934272 | 2.82052 | 0.2 |
| 0.240652 | 2.217583 | 0.2 |
| −0.49072 | 1.687094 | 0.2 |
| −1.25564 | 1.245825 | 0.2 |
| −2.04519 | 0.910113 | 0.2 |
| −2.84446 | 0.692496 | 0.2 |
| −3.63407 | 0.596729 | 0.2 |
| −4.38947 | 0.616513 | 0.2 |
| −5.09431 | 0.735952 | 0.2 |
| −5.73485 | 0.933 | 0.2 |
| −6.30482 | 1.182998 | 0.2 |
| −6.80427 | 1.462311 | 0.2 |
| −7.23744 | 1.750443 | 0.2 |
| −7.61045 | 2.031261 | 0.2 |
| −7.93089 | 2.29152 | 0.2 |
| −8.20648 | 2.521028 | 0.2 |
| −8.44371 | 2.712765 | 0.2 |
| −8.65014 | 2.858296 | 0.2 |
| −8.8294 | 2.951629 | 0.2 |
| −8.98017 | 2.989485 | 0.2 |
| −9.09081 | 2.980373 | 0.2 |
| −9.15983 | 3.032305 | 0.3 |
| −9.20479 | 2.994912 | 0.3 |
| −9.25621 | 2.927258 | 0.3 |
| −9.30193 | 2.804302 | 0.3 |
| −9.31572 | 2.621966 | 0.3 |
| −9.28325 | 2.385672 | 0.3 |
| −9.19846 | 2.099935 | 0.3 |
| −9.05769 | 1.768975 | 0.3 |
| −8.85664 | 1.396996 | 0.3 |
| −8.59049 | 0.989526 | 0.3 |
| −8.25401 | 0.553933 | 0.3 |
| −7.84151 | 0.100116 | 0.3 |
| −7.34707 | −0.35879 | 0.3 |
| −6.76503 | −0.80544 | 0.3 |
| −6.09086 | −1.21722 | 0.3 |
| −5.32316 | −1.56534 | 0.3 |
| −4.4665 | −1.81478 | 0.3 |
| −3.53807 | −1.92843 | 0.3 |
| −2.56208 | −1.8751 | 0.3 |
| −1.57734 | −1.6411 | 0.3 |
| −0.61872 | −1.23511 | 0.3 |
| 0.290811 | −0.681 | 0.3 |
| 1.140164 | −0.0085 | 0.3 |
| 1.926746 | 0.754407 | 0.3 |
| 2.653288 | 1.58321 | 0.3 |
| 3.325225 | 2.457248 | 0.3 |
| 3.948181 | 3.359807 | 0.3 |
| 4.526075 | 4.277897 | 0.3 |
| 5.063739 | 5.199594 | 0.3 |
| 5.565459 | 6.114577 | 0.3 |
| 6.034512 | 7.014009 | 0.3 |
| 6.472538 | 7.89061 | 0.3 |
| 6.881845 | 8.737357 | 0.3 |
| 7.263723 | 9.548295 | 0.3 |
| 7.618741 | 10.31835 | 0.3 |
| 7.94745 | 11.04303 | 0.3 |
| 8.250156 | 11.71851 | 0.3 |
| 8.526903 | 12.34174 | 0.3 |
| 8.777569 | 12.91039 | 0.3 |
| 9.002243 | 13.42276 | 0.3 |
| 9.201046 | 13.8779 | 0.3 |
| 9.374247 | 14.27562 | 0.3 |
| 9.522357 | 14.61651 | 0.3 |
| 9.646174 | 14.90192 | 0.3 |
| 9.746777 | 15.13411 | 0.3 |
| 9.82541 | 15.31627 | 0.3 |
| 9.845428 | 15.46316 | 0.3 |
| 9.806685 | 15.55914 | 0.3 |
| 9.762791 | 15.60748 | 0.3 |
| 9.720887 | 15.63499 | 0.3 |
| 9.680727 | 15.65078 | 0.3 |
| 9.625218 | 15.65942 | 0.3 |
| 9.537436 | 15.64375 | 0.3 |
| 9.437119 | 15.56526 | 0.3 |
| 9.351352 | 15.41759 | 0.3 |
| 9.245745 | 15.22708 | 0.3 |
| 9.116075 | 14.99275 | 0.3 |
| 8.961371 | 14.71271 | 0.3 |
| 8.781012 | 14.38574 | 0.3 |
| 8.574765 | 14.01125 | 0.3 |
| 8.342463 | 13.58939 | 0.3 |
| 8.084178 | 13.12093 | 0.3 |
| 7.800072 | 12.60728 | 0.3 |
| 7.490828 | 12.05019 | 0.3 |
| 7.156503 | 11.45234 | 0.3 |
| 6.79764 | 10.81673 | 0.3 |
| 6.414055 | 10.14725 | 0.3 |
| 6.005332 | 9.448427 | 0.3 |
| 5.571979 | 8.72471 | 0.3 |
| 5.113097 | 7.981818 | 0.3 |
| 4.62732 | 7.226243 | 0.3 |
| 4.114455 | 6.464227 | 0.3 |
| 3.572615 | 5.703668 | 0.3 |
| 2.999549 | 4.953468 | 0.3 |
| 2.393905 | 4.222795 | 0.3 |
| 1.754536 | 3.521753 | 0.3 |
| 1.079505 | 2.862784 | 0.3 |
| 0.368008 | 2.259717 | 0.3 |
| −0.37852 | 1.72731 | 0.3 |
| −1.1558 | 1.281227 | 0.3 |
| −1.95543 | 0.936751 | 0.3 |
| −2.76385 | 0.706435 | 0.3 |
| −3.56339 | 0.596365 | 0.3 |
| −4.33068 | 0.603951 | 0.3 |
| −5.04696 | 0.716135 | 0.3 |
| −5.6983 | 0.912129 | 0.3 |
| −6.27623 | 1.166997 | 0.3 |
| −6.78008 | 1.455809 | 0.3 |
| −7.21412 | 1.756419 | 0.3 |
| −7.58521 | 2.05107 | 0.3 |
| −7.90187 | 2.325368 | 0.3 |
| −8.17321 | 2.567941 | 0.3 |
| −8.40617 | 2.771791 | 0.3 |
| −8.60793 | 2.929933 | 0.3 |
| −8.78408 | 3.035036 | 0.3 |
| −8.93422 | 3.083159 | 0.3 |
| −9.04692 | 3.080901 | 0.3 |
| −9.4062 | 2.167856 | 0.4 |
| −9.4488 | 2.126784 | 0.4 |
| −9.4957 | 2.054726 | 0.4 |
| −9.53266 | 1.927133 | 0.4 |

TABLE 1-continued

| X | Y | Zadim |
|---|---|---|
| −9.53252 | 1.742069 | 0.4 |
| −9.48087 | 1.506266 | 0.4 |
| −9.37176 | 1.225015 | 0.4 |
| −9.20195 | 0.903038 | 0.4 |
| −8.96743 | 0.545057 | 0.4 |
| −8.66379 | 0.157187 | 0.4 |
| −8.28632 | −0.25253 | 0.4 |
| −7.83006 | −0.67338 | 0.4 |
| −7.29011 | −1.09124 | 0.4 |
| −6.66215 | −1.48759 | 0.4 |
| −5.94394 | −1.83898 | 0.4 |
| −5.13661 | −2.11496 | 0.4 |
| −4.2489 | −2.2804 | 0.4 |
| −3.30272 | −2.29962 | 0.4 |
| −2.3247 | −2.14519 | 0.4 |
| −1.35717 | −1.81032 | 0.4 |
| −0.43061 | −1.30872 | 0.4 |
| 0.435874 | −0.66754 | 0.4 |
| 1.235034 | 0.083198 | 0.4 |
| 1.967295 | 0.916147 | 0.4 |
| 2.637572 | 1.80784 | 0.4 |
| 3.252764 | 2.738757 | 0.4 |
| 3.818966 | 3.693435 | 0.4 |
| 4.340391 | 4.659687 | 0.4 |
| 4.822605 | 5.62603 | 0.4 |
| 5.270593 | 6.582459 | 0.4 |
| 5.687544 | 7.520655 | 0.4 |
| 6.075145 | 8.433595 | 0.4 |
| 6.436222 | 9.314325 | 0.4 |
| 6.772418 | 10.15694 | 0.4 |
| 7.084205 | 10.95653 | 0.4 |
| 7.372364 | 11.70859 | 0.4 |
| 7.637463 | 12.40929 | 0.4 |
| 7.879461 | 13.05563 | 0.4 |
| 8.098373 | 13.64528 | 0.4 |
| 8.29449 | 14.17647 | 0.4 |
| 8.467945 | 14.64828 | 0.4 |
| 8.618994 | 15.06053 | 0.4 |
| 8.748116 | 15.41385 | 0.4 |
| 8.856039 | 15.70966 | 0.4 |
| 8.9437 | 15.9503 | 0.4 |
| 9.012246 | 16.13905 | 0.4 |
| 9.026371 | 16.28842 | 0.4 |
| 8.982952 | 16.38378 | 0.4 |
| 8.936351 | 16.43064 | 0.4 |
| 8.892632 | 16.45637 | 0.4 |
| 8.851159 | 16.47021 | 0.4 |
| 8.794517 | 16.47571 | 0.4 |
| 8.706776 | 16.45403 | 0.4 |
| 8.611261 | 16.36735 | 0.4 |
| 8.533871 | 16.21261 | 0.4 |
| 8.438137 | 16.01378 | 0.4 |
| 8.320675 | 15.7692 | 0.4 |
| 8.180637 | 15.47688 | 0.4 |
| 8.017491 | 15.13555 | 0.4 |
| 7.831074 | 14.74458 | 0.4 |
| 7.621211 | 14.30411 | 0.4 |
| 7.388098 | 13.81485 | 0.4 |
| 7.131915 | 13.27817 | 0.4 |
| 6.853012 | 12.696 | 0.4 |
| 6.55125 | 12.07108 | 0.4 |
| 6.227082 | 11.40642 | 0.4 |
| 5.880271 | 10.70586 | 0.4 |
| 5.51001 | 9.973995 | 0.4 |
| 5.11647 | 9.215388 | 0.4 |
| 4.698504 | 8.435708 | 0.4 |
| 4.254143 | 7.641526 | 0.4 |
| 3.783071 | 6.838982 | 0.4 |
| 3.283429 | 6.035593 | 0.4 |
| 2.75237 | 5.240156 | 0.4 |
| 2.188199 | 4.461557 | 0.4 |
| 1.589116 | 3.709787 | 0.4 |
| 0.953733 | 2.995839 | 0.4 |
| 0.280387 | 2.332868 | 0.4 |
| −0.43037 | 1.73468 | 0.4 |
| −1.17562 | 1.21603 | 0.4 |
| −1.94899 | 0.791771 | 0.4 |
| −2.73971 | 0.475637 | 0.4 |
| −3.53206 | 0.276142 | 0.4 |
| −4.30609 | 0.19538 | 0.4 |
| −5.0394 | 0.225289 | 0.4 |
| −5.71739 | 0.348927 | 0.4 |
| −6.32714 | 0.543039 | 0.4 |
| −6.86468 | 0.782207 | 0.4 |
| −7.33154 | 1.0432 | 0.4 |
| −7.73318 | 1.306048 | 0.4 |
| −8.07701 | 1.554831 | 0.4 |
| −8.3712 | 1.777143 | 0.4 |
| −8.62367 | 1.963284 | 0.4 |
| −8.84104 | 2.105527 | 0.4 |
| −9.02692 | 2.198465 | 0.4 |
| −9.18212 | 2.236161 | 0.4 |
| −9.29583 | 2.22556 | 0.4 |
| −9.40706 | 2.336525 | 0.5 |
| −9.45142 | 2.296477 | 0.5 |
| −9.50165 | 2.225713 | 0.5 |
| −9.54516 | 2.09871 | 0.5 |
| −9.55428 | 1.912114 | 0.5 |
| −9.51294 | 1.671848 | 0.5 |
| −9.41398 | 1.383714 | 0.5 |
| −9.25368 | 1.052897 | 0.5 |
| −9.02775 | 0.684477 | 0.5 |
| −8.73149 | 0.284874 | 0.5 |
| −8.35991 | −0.13753 | 0.5 |
| −7.90769 | −0.57162 | 0.5 |
| −7.3696 | −1.00275 | 0.5 |
| −6.74108 | −1.4118 | 0.5 |
| −6.01951 | −1.77419 | 0.5 |
| −5.20628 | −2.05934 | 0.5 |
| −4.31193 | −2.23182 | 0.5 |
| −3.35551 | −2.25691 | 0.5 |
| −2.36664 | −2.11052 | 0.5 |
| −1.38411 | −1.78877 | 0.5 |
| −0.43553 | −1.3068 | 0.5 |
| 0.461976 | −0.69078 | 0.5 |
| 1.301482 | 0.03129 | 0.5 |
| 2.082737 | 0.833826 | 0.5 |
| 2.809447 | 1.694618 | 0.5 |
| 3.487011 | 2.594985 | 0.5 |
| 4.119537 | 3.52036 | 0.5 |
| 4.70994 | 4.458884 | 0.5 |
| 5.262874 | 5.398947 | 0.5 |
| 5.782329 | 6.330457 | 0.5 |
| 6.27017 | 7.245306 | 0.5 |
| 6.727425 | 8.136424 | 0.5 |
| 7.156322 | 8.996691 | 0.5 |
| 7.557755 | 9.820206 | 0.5 |
| 7.931624 | 10.6021 | 0.5 |
| 8.278314 | 11.33782 | 0.5 |
| 8.597965 | 12.02353 | 0.5 |
| 8.890381 | 12.65619 | 0.5 |
| 9.155427 | 13.23341 | 0.5 |
| 9.393125 | 13.75349 | 0.5 |
| 9.603527 | 14.21546 | 0.5 |
| 9.78687 | 14.61916 | 0.5 |
| 9.943682 | 14.96516 | 0.5 |
| 10.07478 | 15.25486 | 0.5 |
| 10.18131 | 15.49054 | 0.5 |
| 10.26466 | 15.67541 | 0.5 |
| 10.29259 | 15.82432 | 0.5 |
| 10.25772 | 15.92424 | 0.5 |
| 10.21522 | 15.9757 | 0.5 |
| 10.17359 | 16.00557 | 0.5 |
| 10.13299 | 16.02319 | 0.5 |
| 10.07632 | 16.03346 | 0.5 |
| 9.98604 | 16.01816 | 0.5 |
| 9.883854 | 15.93709 | 0.5 |
| 9.794426 | 15.78651 | 0.5 |
| 9.682587 | 15.59314 | 0.5 |
| 9.545351 | 15.35523 | 0.5 |
| 9.381726 | 15.07083 | 0.5 |
| 9.191102 | 14.73868 | 0.5 |
| 8.973289 | 14.35815 | 0.5 |
| 8.728139 | 13.92939 | 0.5 |
| 8.455927 | 13.45308 | 0.5 |
| 8.156947 | 12.93058 | 0.5 |

TABLE 1-continued

| X | Y | Zadim |
|---|---|---|
| 7.831733 | 12.3638 | 0.5 |
| 7.480357 | 11.75551 | 0.5 |
| 7.103506 | 11.10871 | 0.5 |
| 6.701315 | 10.42724 | 0.5 |
| 6.273279 | 9.71582 | 0.5 |
| 5.820025 | 8.978963 | 0.5 |
| 5.340865 | 8.222436 | 0.5 |
| 4.834902 | 7.452601 | 0.5 |
| 4.301202 | 6.676355 | 0.5 |
| 3.739559 | 5.90063 | 0.5 |
| 3.148159 | 5.134083 | 0.5 |
| 2.525511 | 4.385977 | 0.5 |
| 1.871363 | 3.66556 | 0.5 |
| 1.185472 | 2.98322 | 0.5 |
| 0.46742 | 2.351213 | 0.5 |
| −0.28156 | 1.782509 | 0.5 |
| −1.05784 | 1.290328 | 0.5 |
| −1.85503 | 0.888012 | 0.5 |
| −2.66314 | 0.587938 | 0.5 |
| −3.46784 | 0.398654 | 0.5 |
| −4.25224 | 0.322748 | 0.5 |
| −4.99484 | 0.354587 | 0.5 |
| −5.68058 | 0.478884 | 0.5 |
| −6.29796 | 0.675033 | 0.5 |
| −6.84175 | 0.91778 | 0.5 |
| −7.31342 | 1.18353 | 0.5 |
| −7.7187 | 1.451563 | 0.5 |
| −8.06524 | 1.705485 | 0.5 |
| −8.36166 | 1.932343 | 0.5 |
| −8.61532 | 2.123327 | 0.5 |
| −8.83453 | 2.268576 | 0.5 |
| −9.02214 | 2.363688 | 0.5 |
| −9.17904 | 2.402799 | 0.5 |
| −9.29424 | 2.392905 | 0.5 |
| −9.71888 | 1.346095 | 0.6 |
| −9.7596 | 1.301656 | 0.6 |
| −9.80446 | 1.22654 | 0.6 |
| −9.84028 | 1.095812 | 0.6 |
| −9.83859 | 0.907553 | 0.6 |
| −9.78146 | 0.668252 | 0.6 |
| −9.66035 | 0.385801 | 0.6 |
| −9.47139 | 0.06673 | 0.6 |
| −9.21056 | −0.2826 | 0.6 |
| −8.87378 | −0.65459 | 0.6 |
| −8.45696 | −1.03973 | 0.6 |
| −7.95612 | −1.42571 | 0.6 |
| −7.36781 | −1.79673 | 0.6 |
| −6.69007 | −2.13274 | 0.6 |
| −5.92371 | −2.40864 | 0.6 |
| −5.07437 | −2.59439 | 0.6 |
| −4.15875 | −2.65813 | 0.6 |
| −3.19556 | −2.5713 | 0.6 |
| −2.22083 | −2.31834 | 0.6 |
| −1.2648 | −1.90171 | 0.6 |
| −0.35023 | −1.33993 | 0.6 |
| 0.510543 | −0.65803 | 0.6 |
| 1.313567 | 0.118461 | 0.6 |
| 2.060163 | 0.966459 | 0.6 |
| 2.754727 | 1.865883 | 0.6 |
| 3.402622 | 2.799846 | 0.6 |
| 4.007263 | 3.755289 | 0.6 |
| 4.571537 | 4.720984 | 0.6 |
| 5.100226 | 5.68577 | 0.6 |
| 5.597099 | 6.64003 | 0.6 |
| 6.063484 | 7.576126 | 0.6 |
| 6.500485 | 8.48706 | 0.6 |
| 6.910411 | 9.365795 | 0.6 |
| 7.294031 | 10.20656 | 0.6 |
| 7.651181 | 11.00453 | 0.6 |
| 7.982345 | 11.75513 | 0.6 |
| 8.287748 | 12.45452 | 0.6 |
| 8.567141 | 13.09967 | 0.6 |
| 8.820319 | 13.68824 | 0.6 |
| 9.047358 | 14.21849 | 0.6 |
| 9.248316 | 14.68948 | 0.6 |
| 9.423422 | 15.10103 | 0.6 |
| 9.573186 | 15.45374 | 0.6 |
| 9.698397 | 15.74906 | 0.6 |
| 9.800138 | 15.98929 | 0.6 |
| 9.879704 | 16.17775 | 0.6 |
| 9.906487 | 16.32821 | 0.6 |
| 9.870617 | 16.42874 | 0.6 |
| 9.827553 | 16.48051 | 0.6 |
| 9.785424 | 16.51045 | 0.6 |
| 9.744172 | 16.52802 | 0.6 |
| 9.686676 | 16.53772 | 0.6 |
| 9.595455 | 16.52034 | 0.6 |
| 9.494591 | 16.43533 | 0.6 |
| 9.408113 | 16.28045 | 0.6 |
| 9.29969 | 16.08186 | 0.6 |
| 9.166677 | 15.83752 | 0.6 |
| 9.008128 | 15.54545 | 0.6 |
| 8.82347 | 15.20433 | 0.6 |
| 8.612539 | 14.81352 | 0.6 |
| 8.375196 | 14.37315 | 0.6 |
| 8.111722 | 13.88391 | 0.6 |
| 7.822386 | 13.34718 | 0.6 |
| 7.507722 | 12.76489 | 0.6 |
| 7.16777 | 12.13983 | 0.6 |
| 6.803121 | 11.47506 | 0.6 |
| 6.413968 | 10.77438 | 0.6 |
| 5.99967 | 10.04256 | 0.6 |
| 5.560702 | 9.284207 | 0.6 |
| 5.096775 | 8.50479 | 0.6 |
| 4.606123 | 7.711128 | 0.6 |
| 4.088619 | 6.909522 | 0.6 |
| 3.54396 | 6.10683 | 0.6 |
| 2.969991 | 5.311718 | 0.6 |
| 2.36521 | 4.533169 | 0.6 |
| 1.729735 | 3.779763 | 0.6 |
| 1.063205 | 3.061401 | 0.6 |
| 0.365095 | 2.389538 | 0.6 |
| −0.36363 | 1.776121 | 0.6 |
| −1.11997 | 1.233255 | 0.6 |
| −1.89854 | 0.772954 | 0.6 |
| −2.6914 | 0.407205 | 0.6 |
| −3.48674 | 0.145247 | 0.6 |
| −4.26915 | −0.0088 | 0.6 |
| −5.02194 | −0.05723 | 0.6 |
| −5.7257 | −0.0116 | 0.6 |
| −6.3706 | 0.109868 | 0.6 |
| −6.94784 | 0.284859 | 0.6 |
| −7.45607 | 0.490916 | 0.6 |
| −7.89786 | 0.707892 | 0.6 |
| −8.27949 | 0.917014 | 0.6 |
| −8.6085 | 1.103266 | 0.6 |
| −8.89095 | 1.256926 | 0.6 |
| −9.13203 | 1.370009 | 0.6 |
| −9.33581 | 1.433531 | 0.6 |
| −9.49873 | 1.445376 | 0.6 |
| −9.61251 | 1.416938 | 0.6 |
| −10.0644 | −0.15989 | 0.7 |
| −10.0985 | −0.21027 | 0.7 |
| −10.1339 | −0.2911 | 0.7 |
| −10.1566 | −0.42611 | 0.7 |
| −10.1374 | −0.61478 | 0.7 |
| −10.0558 | −0.84953 | 0.7 |
| −9.90149 | −1.11853 | 0.7 |
| −9.67074 | −1.41315 | 0.7 |
| −9.36033 | −1.72495 | 0.7 |
| −8.96763 | −2.04469 | 0.7 |
| −8.4904 | −2.3613 | 0.7 |
| −7.92718 | −2.66125 | 0.7 |
| −7.27791 | −2.92788 | 0.7 |
| −6.54498 | −3.14126 | 0.7 |
| −5.73439 | −3.27915 | 0.7 |
| −4.85943 | −3.31518 | 0.7 |
| −3.93563 | −3.22266 | 0.7 |
| −2.99055 | −2.98294 | 0.7 |
| −2.05366 | −2.5895 | 0.7 |
| −1.14958 | −2.05076 | 0.7 |
| −0.29452 | −1.38574 | 0.7 |
| 0.503956 | −0.61717 | 0.7 |
| 1.24466 | 0.232663 | 0.7 |
| 1.930267 | 1.143714 | 0.7 |
| 2.565844 | 2.098301 | 0.7 |

TABLE 1-continued

| X | Y | Zadim |
|---|---|---|
| 3.156699 | 3.081532 | 0.7 |
| 3.705853 | 4.081743 | 0.7 |
| 4.2165 | 5.088337 | 0.7 |
| 4.693655 | 6.09079 | 0.7 |
| 5.140859 | 7.080132 | 0.7 |
| 5.559245 | 8.049081 | 0.7 |
| 5.950355 | 8.990664 | 0.7 |
| 6.316619 | 9.898053 | 0.7 |
| 6.65876 | 10.76563 | 0.7 |
| 6.97677 | 11.58858 | 0.7 |
| 7.271341 | 12.36232 | 0.7 |
| 7.542751 | 13.08306 | 0.7 |
| 7.790796 | 13.74778 | 0.7 |
| 8.01545 | 14.35407 | 0.7 |
| 8.216835 | 14.90022 | 0.7 |
| 8.395045 | 15.38527 | 0.7 |
| 8.550291 | 15.80908 | 0.7 |
| 8.683059 | 16.17227 | 0.7 |
| 8.794051 | 16.47635 | 0.7 |
| 8.88424 | 16.7237 | 0.7 |
| 8.954708 | 16.91774 | 0.7 |
| 8.976197 | 17.07045 | 0.7 |
| 8.936771 | 17.17067 | 0.7 |
| 8.891898 | 17.22174 | 0.7 |
| 8.848576 | 17.25078 | 0.7 |
| 8.80615 | 17.26739 | 0.7 |
| 8.747484 | 17.27518 | 0.7 |
| 8.655558 | 17.25333 | 0.7 |
| 8.558399 | 17.16149 | 0.7 |
| 8.479074 | 16.99973 | 0.7 |
| 8.379743 | 16.79249 | 0.7 |
| 8.257923 | 16.53753 | 0.7 |
| 8.112761 | 16.23279 | 0.7 |
| 7.94375 | 15.87689 | 0.7 |
| 7.750757 | 15.46918 | 0.7 |
| 7.533651 | 15.00978 | 0.7 |
| 7.292683 | 14.49939 | 0.7 |
| 7.028067 | 13.93945 | 0.7 |
| 6.740263 | 13.3319 | 0.7 |
| 6.429226 | 12.67954 | 0.7 |
| 6.095351 | 11.98555 | 0.7 |
| 5.738782 | 11.25371 | 0.7 |
| 5.358723 | 10.48875 | 0.7 |
| 4.955285 | 9.69543 | 0.7 |
| 4.528191 | 8.879116 | 0.7 |
| 4.075582 | 8.046432 | 0.7 |
| 3.596751 | 7.20385 | 0.7 |
| 3.091408 | 6.358033 | 0.7 |
| 2.557439 | 5.517209 | 0.7 |
| 1.99279 | 4.690249 | 0.7 |
| 1.397172 | 3.885592 | 0.7 |
| 0.770257 | 3.11247 | 0.7 |
| 0.111225 | 2.381586 | 0.7 |
| −0.57955 | 1.704141 | 0.7 |
| −1.30009 | 1.091683 | 0.7 |
| −2.04598 | 0.555328 | 0.7 |
| −2.81057 | 0.105851 | 0.7 |
| −3.58416 | −0.24768 | 0.7 |
| −4.35392 | −0.4996 | 0.7 |
| −5.10438 | −0.65114 | 0.7 |
| −5.8196 | −0.70986 | 0.7 |
| −6.48503 | −0.69071 | 0.7 |
| −7.09291 | −0.61291 | 0.7 |
| −7.63781 | −0.49742 | 0.7 |
| −8.11968 | −0.36441 | 0.7 |
| −8.54138 | −0.23208 | 0.7 |
| −8.90743 | −0.11587 | 0.7 |
| −9.22205 | −0.02789 | 0.7 |
| −9.48852 | 0.019802 | 0.7 |
| −9.7052 | 0.024414 | 0.7 |
| −9.86729 | −0.01168 | 0.7 |
| −9.97184 | −0.06869 | 0.7 |
| −10.6896 | −0.52801 | 0.8 |
| −10.7108 | −0.58624 | 0.8 |
| −10.7347 | −0.67317 | 0.8 |
| −10.7535 | −0.81089 | 0.8 |
| −10.74 | −1.00361 | 0.8 |
| −10.6695 | −1.24683 | 0.8 |
| −10.519 | −1.52453 | 0.8 |
| −10.281 | −1.82242 | 0.8 |
| −9.95651 | −2.13162 | 0.8 |
| −9.54364 | −2.4412 | 0.8 |
| −9.0416 | −2.73883 | 0.8 |
| −8.45109 | −3.01111 | 0.8 |
| −7.77444 | −3.24279 | 0.8 |
| −7.01589 | −3.41575 | 0.8 |
| −6.18444 | −3.50949 | 0.8 |
| −5.29082 | −3.50314 | 0.8 |
| −4.3538 | −3.37501 | 0.8 |
| −3.39671 | −3.11122 | 0.8 |
| −2.44346 | −2.7077 | 0.8 |
| −1.51469 | −2.17203 | 0.8 |
| −0.62515 | −1.51887 | 0.8 |
| 0.218036 | −0.76791 | 0.8 |
| 1.012619 | 0.061405 | 0.8 |
| 1.759569 | 0.951069 | 0.8 |
| 2.462004 | 1.884722 | 0.8 |
| 3.123555 | 2.848122 | 0.8 |
| 3.745942 | 3.829971 | 0.8 |
| 4.331384 | 4.819712 | 0.8 |
| 4.883891 | 5.806674 | 0.8 |
| 5.405979 | 6.781835 | 0.8 |
| 5.898042 | 7.737889 | 0.8 |
| 6.361073 | 8.667723 | 0.8 |
| 6.796818 | 9.564358 | 0.8 |
| 7.205452 | 10.42213 | 0.8 |
| 7.586602 | 11.23614 | 0.8 |
| 7.940618 | 12.00174 | 0.8 |
| 8.267436 | 12.71505 | 0.8 |
| 8.566618 | 13.37305 | 0.8 |
| 8.837957 | 13.9733 | 0.8 |
| 9.081435 | 14.51404 | 0.8 |
| 9.297058 | 14.99432 | 0.8 |
| 9.48502 | 15.41398 | 0.8 |
| 9.645853 | 15.77362 | 0.8 |
| 9.780354 | 16.07473 | 0.8 |
| 9.88968 | 16.31967 | 0.8 |
| 9.975121 | 16.51184 | 0.8 |
| 10.01106 | 16.66482 | 0.8 |
| 9.981201 | 16.7702 | 0.8 |
| 9.940886 | 16.82661 | 0.8 |
| 9.899886 | 16.86042 | 0.8 |
| 9.858052 | 16.88154 | 0.8 |
| 9.798719 | 16.89474 | 0.8 |
| 9.70263 | 16.87897 | 0.8 |
| 9.598365 | 16.79005 | 0.8 |
| 9.505679 | 16.62971 | 0.8 |
| 9.389478 | 16.42396 | 0.8 |
| 9.246891 | 16.17084 | 0.8 |
| 9.076903 | 15.86826 | 0.8 |
| 8.878893 | 15.51487 | 0.8 |
| 8.652659 | 15.11 | 0.8 |
| 8.398093 | 14.65379 | 0.8 |
| 8.1155 | 14.14694 | 0.8 |
| 7.805206 | 13.59089 | 0.8 |
| 7.467816 | 12.98763 | 0.8 |
| 7.103516 | 12.33999 | 0.8 |
| 6.712919 | 11.65121 | 0.8 |
| 6.296494 | 10.92514 | 0.8 |
| 5.853886 | 10.1666 | 0.8 |
| 5.385469 | 9.380501 | 0.8 |
| 4.891091 | 8.572503 | 0.8 |
| 4.370322 | 7.748896 | 0.8 |
| 3.822584 | 6.916512 | 0.8 |
| 3.24707 | 6.082828 | 0.8 |
| 2.642377 | 5.2563 | 0.8 |
| 2.009414 | 4.444303 | 0.8 |
| 1.347201 | 3.656278 | 0.8 |
| 0.654953 | 2.902498 | 0.8 |
| −0.06735 | 2.193869 | 0.8 |
| −0.81928 | 1.542553 | 0.8 |
| −1.59879 | 0.961379 | 0.8 |
| −2.40073 | 0.462223 | 0.8 |
| −3.21727 | 0.056253 | 0.8 |
| −4.03674 | −0.24897 | 0.8 |
| −4.84443 | −0.45115 | 0.8 |

TABLE 1-continued

| X | Y | Zadim |
|---|---|---|
| −5.62422 | −0.55506 | 0.8 |
| −6.36124 | −0.57576 | 0.8 |
| −7.0447 | −0.53291 | 0.8 |
| −7.66887 | −0.44912 | 0.8 |
| −8.23223 | −0.34666 | 0.8 |
| −8.73614 | −0.24548 | 0.8 |
| −9.18287 | −0.16154 | 0.8 |
| −9.57411 | −0.10802 | 0.8 |
| −9.90976 | −0.09911 | 0.8 |
| −10.1846 | −0.14442 | 0.8 |
| −10.3906 | −0.22998 | 0.8 |
| −10.5289 | −0.32966 | 0.8 |
| −10.6138 | −0.41786 | 0.8 |
| −12.0981 | −2.10799 | 0.9 |
| −12.1121 | −2.17258 | 0.9 |
| −12.1258 | −2.26662 | 0.9 |
| −12.1311 | −2.41194 | 0.9 |
| −12.1054 | −2.61507 | 0.9 |
| −12.0158 | −2.86603 | 0.9 |
| −11.8359 | −3.14516 | 0.9 |
| −11.5561 | −3.43236 | 0.9 |
| −11.1821 | −3.7203 | 0.9 |
| −10.7148 | −3.99699 | 0.9 |
| −10.1547 | −4.24929 | 0.9 |
| −9.50486 | −4.46457 | 0.9 |
| −8.76986 | −4.62823 | 0.9 |
| −7.95643 | −4.7249 | 0.9 |
| −7.07478 | −4.73566 | 0.9 |
| −6.13897 | −4.64178 | 0.9 |
| −5.16737 | −4.4254 | 0.9 |
| −4.18246 | −4.07488 | 0.9 |
| −3.20688 | −3.58845 | 0.9 |
| −2.25964 | −2.97388 | 0.9 |
| −1.35497 | −2.24424 | 0.9 |
| −0.50114 | −1.41664 | 0.9 |
| 0.298058 | −0.50878 | 0.9 |
| 1.043637 | 0.461061 | 0.9 |
| 1.738972 | 1.476118 | 0.9 |
| 2.388473 | 2.521425 | 0.9 |
| 2.995285 | 3.584591 | 0.9 |
| 3.561632 | 4.654903 | 0.9 |
| 4.091709 | 5.721514 | 0.9 |
| 4.589406 | 6.774605 | 0.9 |
| 5.056049 | 7.806239 | 0.9 |
| 5.492756 | 8.809096 | 0.9 |
| 5.901842 | 9.775874 | 0.9 |
| 6.284306 | 10.70039 | 0.9 |
| 6.639995 | 11.5775 | 0.9 |
| 6.969556 | 12.4023 | 0.9 |
| 7.273315 | 13.17065 | 0.9 |
| 7.551043 | 13.87932 | 0.9 |
| 7.802682 | 14.52572 | 0.9 |
| 8.028336 | 15.10799 | 0.9 |
| 8.228105 | 15.62512 | 0.9 |
| 8.402199 | 16.07695 | 0.9 |
| 8.551138 | 16.46415 | 0.9 |
| 8.675682 | 16.78831 | 0.9 |
| 8.776912 | 17.052 | 0.9 |
| 8.855685 | 17.25896 | 0.9 |
| 8.891534 | 17.42063 | 0.9 |
| 8.861198 | 17.53115 | 0.9 |
| 8.818171 | 17.59044 | 0.9 |
| 8.774408 | 17.6253 | 0.9 |
| 8.729919 | 17.64628 | 0.9 |
| 8.667255 | 17.65764 | 0.9 |
| 8.56754 | 17.63424 | 0.9 |
| 8.46786 | 17.53119 | 0.9 |
| 8.37975 | 17.35809 | 0.9 |
| 8.270302 | 17.13564 | 0.9 |
| 8.136046 | 16.86197 | 0.9 |
| 7.976005 | 16.53488 | 0.9 |
| 7.789604 | 16.15291 | 0.9 |
| 7.576591 | 15.71539 | 0.9 |
| 7.336865 | 15.22245 | 0.9 |
| 7.070682 | 14.67484 | 0.9 |
| 6.778284 | 14.07411 | 0.9 |
| 6.460163 | 13.42238 | 0.9 |
| 6.116313 | 12.72266 | 0.9 |
| 5.747181 | 11.97837 | 0.9 |
| 5.353047 | 11.19356 | 0.9 |
| 4.933375 | 10.37322 | 0.9 |
| 4.48821 | 9.522531 | 0.9 |
| 4.016602 | 8.647671 | 0.9 |
| 3.516148 | 7.756092 | 0.9 |
| 2.983202 | 6.856592 | 0.9 |
| 2.412136 | 5.960105 | 0.9 |
| 1.796025 | 5.079786 | 0.9 |
| 1.128375 | 4.230458 | 0.9 |
| 0.405148 | 3.428059 | 0.9 |
| −0.37441 | 2.689341 | 0.9 |
| −1.21002 | 2.034797 | 0.9 |
| −2.09489 | 1.483365 | 0.9 |
| −3.01481 | 1.045673 | 0.9 |
| −3.95035 | 0.721388 | 0.9 |
| −4.88086 | 0.501052 | 0.9 |
| −5.78765 | 0.363041 | 0.9 |
| −6.65704 | 0.27852 | 0.9 |
| −7.48048 | 0.217214 | 0.9 |
| −8.25161 | 0.15174 | 0.9 |
| −8.96455 | 0.059485 | 0.9 |
| −9.61184 | −0.07492 | 0.9 |
| −10.1846 | −0.25736 | 0.9 |
| −10.6742 | −0.48262 | 0.9 |
| −11.0768 | −0.73683 | 0.9 |
| −11.3953 | −1.00146 | 0.9 |
| −11.6368 | −1.2582 | 0.9 |
| −11.8124 | −1.4919 | 0.9 |
| −11.9337 | −1.69209 | 0.9 |
| −12.0122 | −1.85315 | 0.9 |
| −12.0589 | −1.97283 | 0.9 |
| −13.6094 | −3.68219 | 1 |
| −13.594 | −3.75853 | 1 |
| −13.5722 | −3.86233 | 1 |
| −13.5367 | −4.00683 | 1 |
| −13.4711 | −4.19512 | 1 |
| −13.361 | −4.42688 | 1 |
| −13.1926 | −4.69502 | 1 |
| −12.9452 | −4.99792 | 1 |
| −12.5942 | −5.32124 | 1 |
| −12.122 | −5.63602 | 1 |
| −11.5283 | −5.90446 | 1 |
| −10.825 | −6.09883 | 1 |
| −10.0287 | −6.20889 | 1 |
| −9.15453 | −6.23333 | 1 |
| −8.21771 | −6.16641 | 1 |
| −7.23155 | −6.00038 | 1 |
| −6.21258 | −5.71913 | 1 |
| −5.18307 | −5.3049 | 1 |
| −4.16827 | −4.74834 | 1 |
| −3.18705 | −4.0591 | 1 |
| −2.25303 | −3.25206 | 1 |
| −1.37402 | −2.34522 | 1 |
| −0.5536 | −1.35676 | 1 |
| 0.208402 | −0.30448 | 1 |
| 0.914037 | 0.79529 | 1 |
| 1.567919 | 1.926914 | 1 |
| 2.17439 | 3.076818 | 1 |
| 2.736194 | 4.233581 | 1 |
| 3.257422 | 5.386083 | 1 |
| 3.743057 | 6.523723 | 1 |
| 4.195593 | 7.63775 | 1 |
| 4.616551 | 8.720392 | 1 |
| 5.008676 | 9.763972 | 1 |
| 5.373819 | 10.76177 | 1 |
| 5.712257 | 11.70821 | 1 |
| 6.024882 | 12.59813 | 1 |
| 6.31248 | 13.42708 | 1 |
| 6.575049 | 14.19155 | 1 |
| 6.812707 | 14.8888 | 1 |
| 7.025706 | 15.51683 | 1 |
| 7.214229 | 16.07456 | 1 |
| 7.378519 | 16.56182 | 1 |
| 7.519078 | 16.97935 | 1 |
| 7.636641 | 17.3289 | 1 |
| 7.732213 | 17.61321 | 1 |
| 7.806599 | 17.83601 | 1 |

TABLE 1-continued

| X | Y | Zadim |
|---|---|---|
| 7.843443 | 18.00831 | 1 |
| 7.814653 | 18.12621 | 1 |
| 7.769526 | 18.18973 | 1 |
| 7.723054 | 18.22676 | 1 |
| 7.674009 | 18.24889 | 1 |
| 7.605231 | 18.25858 | 1 |
| 7.498645 | 18.22293 | 1 |
| 7.403942 | 18.09822 | 1 |
| 7.317066 | 17.90452 | 1 |
| 7.20906 | 17.65593 | 1 |
| 7.076564 | 17.35016 | 1 |
| 6.918616 | 16.98474 | 1 |
| 6.734636 | 16.55807 | 1 |
| 6.524306 | 16.06943 | 1 |
| 6.287508 | 15.51896 | 1 |
| 6.024429 | 14.90752 | 1 |
| 5.735162 | 14.23684 | 1 |
| 5.419977 | 13.50934 | 1 |
| 5.078599 | 12.72837 | 1 |
| 4.711318 | 11.89769 | 1 |
| 4.318475 | 11.02165 | 1 |
| 3.899242 | 10.10567 | 1 |
| 3.450392 | 9.156866 | 1 |
| 2.964942 | 8.184864 | 1 |
| 2.431167 | 7.20293 | 1 |
| 1.832592 | 6.229425 | 1 |
| 1.151023 | 5.288595 | 1 |
| 0.371746 | 4.41008 | 1 |
| −0.51319 | 3.62874 | 1 |
| −1.5001 | 2.981355 | 1 |
| −2.56651 | 2.491449 | 1 |
| −3.6785 | 2.160906 | 1 |
| −4.80348 | 1.97421 | 1 |
| −5.91521 | 1.898493 | 1 |
| −6.9982 | 1.881011 | 1 |
| −8.04449 | 1.862709 | 1 |
| −9.04345 | 1.778327 | 1 |
| −9.97143 | 1.578484 | 1 |
| −10.7989 | 1.256685 | 1 |
| −11.5049 | 0.832385 | 1 |
| −12.0858 | 0.342149 | 1 |
| −12.5521 | −0.18179 | 1 |
| −12.9107 | −0.70329 | 1 |
| −13.1939 | −1.23822 | 1 |
| −13.3936 | −1.74328 | 1 |
| −13.522 | −2.19482 | 1 |
| −13.597 | −2.58522 | 1 |
| −13.6349 | −2.91233 | 1 |
| −13.6479 | −3.17374 | 1 |
| −13.6465 | −3.37038 | 1 |
| −13.6368 | −3.51124 | 1 |
| −14.326 | −3.76941 | 1.075003 |
| −14.2118 | −4.22031 | 1.075003 |
| −14.0665 | −4.58722 | 1.075003 |
| −13.9079 | −4.88537 | 1.075003 |
| −13.7373 | −5.14138 | 1.075003 |
| −13.5512 | −5.37197 | 1.075003 |
| −13.3483 | −5.58267 | 1.075003 |
| −13.1278 | −5.77624 | 1.075003 |
| −12.8883 | −5.95435 | 1.075003 |
| −12.621 | −6.12168 | 1.075003 |
| −12.0333 | −6.39803 | 1.075003 |
| −11.3321 | −6.60401 | 1.075003 |
| −10.5401 | −6.71136 | 1.075003 |
| −9.68015 | −6.70462 | 1.075003 |
| −8.77346 | −6.57897 | 1.075003 |
| −7.83446 | −6.33705 | 1.075003 |
| −6.87119 | −5.98664 | 1.075003 |
| −5.88764 | −5.53401 | 1.075003 |
| −4.89076 | −4.98021 | 1.075003 |
| −3.89552 | −4.3182 | 1.075003 |
| −2.92226 | −3.5433 | 1.075003 |
| −1.98716 | −2.66272 | 1.075003 |
| −1.09941 | −1.69205 | 1.075003 |
| −0.26324 | −0.64924 | 1.075003 |
| 0.520834 | 0.447685 | 1.075003 |
| 1.255052 | 1.581436 | 1.075003 |
| 1.942242 | 2.736895 | 1.075003 |
| 2.584141 | 3.901582 | 1.075003 |
| 3.183908 | 5.063375 | 1.075003 |
| 3.74574 | 6.210687 | 1.075003 |
| 4.271636 | 7.334265 | 1.075003 |
| 4.76296 | 8.425929 | 1.075003 |
| 5.222064 | 9.477624 | 1.075003 |
| 5.650404 | 10.48245 | 1.075003 |
| 6.048153 | 11.43485 | 1.075003 |
| 6.416041 | 12.32959 | 1.075003 |
| 6.754675 | 13.16223 | 1.075003 |
| 7.063931 | 13.92944 | 1.075003 |
| 7.343901 | 14.62857 | 1.075003 |
| 7.59481 | 15.25775 | 1.075003 |
| 7.816825 | 15.81606 | 1.075003 |
| 8.010254 | 16.30349 | 1.075003 |
| 8.175714 | 16.72089 | 1.075003 |
| 8.314068 | 17.07012 | 1.075003 |
| 8.426533 | 17.35405 | 1.075003 |
| 8.514691 | 17.57657 | 1.075003 |
| 8.562587 | 17.74999 | 1.075003 |
| 8.53944 | 17.87256 | 1.075003 |
| 8.499157 | 17.93792 | 1.075003 |
| 8.457457 | 17.97679 | 1.075003 |
| 8.415351 | 18.00094 | 1.075003 |
| 8.355537 | 18.01692 | 1.075003 |
| 8.259625 | 18.00414 | 1.075003 |
| 8.149987 | 17.90874 | 1.075003 |
| 8.054665 | 17.72495 | 1.075003 |
| 7.937315 | 17.48754 | 1.075003 |
| 7.793241 | 17.19536 | 1.075003 |
| 7.621284 | 16.84597 | 1.075003 |
| 7.420732 | 16.43775 | 1.075003 |
| 7.191165 | 15.96991 | 1.075003 |
| 6.932473 | 15.44243 | 1.075003 |
| 6.644794 | 14.856 | 1.075003 |
| 6.328301 | 14.21217 | 1.075003 |
| 5.983447 | 13.51307 | 1.075003 |
| 5.610344 | 12.7618 | 1.075003 |
| 5.209214 | 11.96204 | 1.075003 |
| 4.781118 | 11.11757 | 1.075003 |
| 4.326746 | 10.233 | 1.075003 |
| 3.843898 | 9.315355 | 1.075003 |
| 3.326555 | 8.375243 | 1.075003 |
| 2.763346 | 7.428984 | 1.075003 |
| 2.141038 | 6.499456 | 1.075003 |
| 1.446985 | 5.618034 | 1.075003 |
| 0.675906 | 4.817731 | 1.075003 |
| −0.17511 | 4.121662 | 1.075003 |
| −1.10845 | 3.552341 | 1.075003 |
| −2.11363 | 3.123046 | 1.075003 |
| −3.1738 | 2.838839 | 1.075003 |
| −4.26632 | 2.688389 | 1.075003 |
| −5.36698 | 2.636176 | 1.075003 |
| −6.45419 | 2.626505 | 1.075003 |
| −7.50195 | 2.600138 | 1.075003 |
| −8.47553 | 2.518738 | 1.075003 |
| −9.34696 | 2.373145 | 1.075003 |
| −10.1152 | 2.168959 | 1.075003 |
| −10.8052 | 1.910018 | 1.075003 |
| −11.4492 | 1.587902 | 1.075003 |
| −12.0683 | 1.185469 | 1.075003 |
| −12.6606 | 0.687817 | 1.075003 |
| −13.2043 | 0.091877 | 1.075003 |
| −13.5175 | −0.34332 | 1.075003 |
| −13.7988 | −0.8259 | 1.075003 |
| −14.0207 | −1.31004 | 1.075003 |
| −14.179 | −1.76204 | 1.075003 |
| −14.284 | −2.17246 | 1.075003 |
| −14.349 | −2.55579 | 1.075003 |
| −14.3813 | −2.94409 | 1.075003 |
| −14.9886 | −5.43265 | 1.150007 |
| −14.7868 | −5.95502 | 1.150007 |
| −14.5681 | −6.36183 | 1.150007 |
| −14.353 | −6.67466 | 1.150007 |
| −14.1385 | −6.92981 | 1.150007 |
| −13.918 | −7.14935 | 1.150007 |
| −13.692 | −7.33961 | 1.150007 |
| −13.4624 | −7.50401 | 1.150007 |

TABLE 1-continued

| X | Y | Zadim |
|---|---|---|
| −13.2306 | −7.64572 | 1.150007 |
| −12.9884 | −7.7718 | 1.150007 |
| −12.3653 | −8.01057 | 1.150007 |
| −11.6274 | −8.16808 | 1.150007 |
| −10.8025 | −8.21465 | 1.150007 |
| −9.91703 | −8.13499 | 1.150007 |
| −8.99555 | −7.9249 | 1.150007 |
| −8.05509 | −7.58738 | 1.150007 |
| −7.10579 | −7.12924 | 1.150007 |
| −6.15034 | −6.56041 | 1.150007 |
| −5.18959 | −5.89241 | 1.150007 |
| −4.23041 | −5.12804 | 1.150007 |
| −3.28875 | −4.26465 | 1.150007 |
| −2.38371 | −3.3027 | 1.150007 |
| −1.52806 | −2.25271 | 1.150007 |
| −0.72871 | −1.13033 | 1.150007 |
| 0.014681 | 0.04561 | 1.150007 |
| 0.704732 | 1.257513 | 1.150007 |
| 1.345199 | 2.489687 | 1.150007 |
| 1.938393 | 3.72927 | 1.150007 |
| 2.487789 | 4.964009 | 1.150007 |
| 2.998445 | 6.18201 | 1.150007 |
| 3.473185 | 7.37365 | 1.150007 |
| 3.913925 | 8.530504 | 1.150007 |
| 4.323501 | 9.644372 | 1.150007 |
| 4.703995 | 10.70812 | 1.150007 |
| 5.056013 | 11.71595 | 1.150007 |
| 5.380622 | 12.66251 | 1.150007 |
| 5.678808 | 13.5432 | 1.150007 |
| 5.950673 | 14.35455 | 1.150007 |
| 6.196511 | 15.09381 | 1.150007 |
| 6.416687 | 15.75904 | 1.150007 |
| 6.611434 | 16.34932 | 1.150007 |
| 6.781075 | 16.86462 | 1.150007 |
| 6.926188 | 17.30588 | 1.150007 |
| 7.04754 | 17.67507 | 1.150007 |
| 7.146202 | 17.97522 | 1.150007 |
| 7.223796 | 18.2104 | 1.150007 |
| 7.26648 | 18.39182 | 1.150007 |
| 7.239933 | 18.51868 | 1.150007 |
| 7.196285 | 18.58542 | 1.150007 |
| 7.151907 | 18.62435 | 1.150007 |
| 7.107696 | 18.64765 | 1.150007 |
| 7.045672 | 18.66144 | 1.150007 |
| 6.948353 | 18.64281 | 1.150007 |
| 6.843257 | 18.53623 | 1.150007 |
| 6.757007 | 18.34082 | 1.150007 |
| 6.651602 | 18.08874 | 1.150007 |
| 6.522207 | 17.77854 | 1.150007 |
| 6.367771 | 17.40768 | 1.150007 |
| 6.187651 | 16.97443 | 1.150007 |
| 5.981421 | 16.478 | 1.150007 |
| 5.748996 | 15.91835 | 1.150007 |
| 5.490447 | 15.29623 | 1.150007 |
| 5.205842 | 14.61325 | 1.150007 |
| 4.895507 | 13.87166 | 1.150007 |
| 4.559394 | 13.07464 | 1.150007 |
| 4.197443 | 12.22605 | 1.150007 |
| 3.810781 | 11.32972 | 1.150007 |
| 3.400282 | 10.39018 | 1.150007 |
| 2.962481 | 9.414985 | 1.150007 |
| 2.487908 | 8.416319 | 1.150007 |
| 1.962607 | 7.411832 | 1.150007 |
| 1.366155 | 6.42926 | 1.150007 |
| 0.679489 | 5.506991 | 1.150007 |
| −0.10413 | 4.68401 | 1.150007 |
| −0.98802 | 3.985503 | 1.150007 |
| −1.97513 | 3.435063 | 1.150007 |
| −3.05342 | 3.046209 | 1.150007 |
| −4.20088 | 2.817981 | 1.150007 |
| −5.38852 | 2.719621 | 1.150007 |
| −6.58564 | 2.699511 | 1.150007 |
| −7.75822 | 2.69523 | 1.150007 |
| −8.86152 | 2.648183 | 1.150007 |
| −9.84344 | 2.52848 | 1.150007 |
| −10.6754 | 2.34057 | 1.150007 |
| −11.3774 | 2.099052 | 1.150007 |
| −12.0051 | 1.801458 | 1.150007 |
| −12.6142 | 1.419724 | 1.150007 |
| −13.2289 | 0.913998 | 1.150007 |
| −13.831 | 0.255033 | 1.150007 |
| −14.3665 | −0.54768 | 1.150007 |
| −14.6707 | −1.16381 | 1.150007 |
| −14.9169 | −1.83487 | 1.150007 |
| −15.082 | −2.48255 | 1.150007 |
| −15.1742 | −3.0589 | 1.150007 |
| −15.2138 | −3.55699 | 1.150007 |
| −15.2171 | −4.00565 | 1.150007 |
| −15.1872 | −4.458 | 1.150007 |
| −15.1134 | −4.94417 | 1.150007 |

In the above Table 1, the plane Zadim=0 corresponds to the reference plane P0 situated at the base of the profile. This plane P0 is the intersection of the stacking axis AE of the set of vanes with the axisymmetric surface of the hub, i.e. it passes via the intersection between the axis AE and the surface where it is assembled with the inner shroud. The plane Zadim=1 corresponds to the reference plane P1 situated at the top of the profile. This plane P1 is the intersection between the axis AE and the axisymmetric surface of the casing, i.e. it passes via the intersection of the axis AE with the surface where it is assembled with the outer ring.

By convention, the stacking axis AE of a vane of a nozzle, is an axis that extends in the radial direction Z and is an axis on which the various X,Y sections of the set of vanes are "stacked" when designing the set of vanes.

As mentioned at the beginning of the present description, the aerodynamic profile of the disclosure is substantially identical to the nominal profile defined in the above table, i.e. it departs from said nominal profile by very little at most, being defined in particular within an envelope of ±1 mm in a direction normal to the surface of the nominal profile, and/or having X,Y coordinates lying within a range of ±5% relative to the coordinates X,Y of the nominal profile. Also, the aerodynamic profile is positioned rotated within ±10°, particularly within ±5°, more particularly within ±3°, with respect to the stacking axis of the vane. In other words, the stagger angle may vary by ±10°, particularly by ±5°, more particularly by ±3°.

The coordinate Zadim is non-dimensional, i.e. for a point P, situated at a distance D from the plane P0 (where D is measured along the axis Z), the value of Zadim is D/H, where H represents the total height of the profile as measured between the planes P0 and P1. Naturally, in the Table 1 above, by multiplying the coordinate Zadim by the height H, it is possible to obtain the complete coordinates of the vane.

By way of example, the total height H is preferably about 70 mm ±10%. By way of example, the plane P0 is situated at a distance of about 397 mm ±10% from the axis A.

In the above table, the profile is characterized by fifteen section planes at constant Zadim coordinates, for which the coordinates X and Y are specified. These fifteen section planes include fifteen section planes located between Zadim=0 and Zadim=1, and thus arranged in the fluid stream, these section planes being distributed from P0 to P1. The fifteen section planes also include four section planes which are substantially outside the fluid stream (two section planes with Zadim<0, and two section planes with Zadim>1), these four section planes being provided for ensuring geometric continuity of the stacking, close to the head and the foot, respectively. In each section plane at constant coordinate Zadim, the section of the profile is given by a continuous and smooth curve, interconnecting all of the points (X,Y). In each section plane, the profile is interpolated so as to generate a uniform profile. Between the section planes, the profile is to be interpolated so as to generate a complete vane, as homogeneous as possible.

It is advantageous for the nozzle that includes the vane of the disclosure to have 155 to 175 vanes, more particularly 165 vanes, that present aerodynamic profiles as defined above.

What is claimed is:

1. An aerodynamic profile for a turbine vane, the profile being, when cold and in a non-coated state, substantially identical to a nominal profile determined by Cartesian coordinates X,Y,Zadim given in Table 1, in which the coordinate Zadim is a quotient D/H, where D is a distance of a point under consideration from a reference X,Y plane situated at a base of the nominal profile, and H is a height of said profile measured from said reference plane out to the end of the vane, the measurements D and H being taken radially relative to an axis of a turbine, while the coordinate X is measured in an axial direction of the turbine, and wherein X and Y are dimensionalized values measured in millimeters (mm).

2. The aerodynamic profile as claimed in claim 1, wherein said profile is defined within an envelope of ±1 mm in a direction normal to the surface of the nominal profile.

3. The aerodynamic profile as claimed in claim 1, wherein the coordinates X,Y of said profile lie within a range of ±5% relative to the coordinates X,Y of the nominal profile.

4. The aerodynamic profile as claimed in claim 1, wherein the aerodynamic profile is positioned rotated within ±10° with respect to the radial axis of the vane, along which the coordinate Zadim is measured.

5. The aerodynamic profile as claimed in claim 1, wherein the aerodynamic profile is positioned rotated within ±5° with respect to the radial axis of the vane, along which the coordinate Zadim is measured.

6. The aerodynamic profile as claimed in claim 1, wherein the aerodynamic profile is positioned rotated within ±3° with respect to the radial axis of the vane, along which the coordinate Zadim is measured.

7. The aerodynamic profile as claimed in claim 1, wherein the vane is a nozzle vane forming a part of a stator of the turbine.

8. A turbine vane, presenting the aerodynamic profile as claimed in claim 1.

9. A turbine, including turbine vanes presenting aerodynamic profiles as claimed in claim 1.

10. The turbine as claimed in claim 9, including a nozzle that is stationary in rotation, having 155 to 175 vanes that present the aerodynamic profile.

11. The turbine as claimed in claim 9, including a nozzle that is stationary in rotation, having 165 vanes that present the aerodynamic profile.

12. A turbine nozzle forming a portion of a turbine stator, wherein all the vanes of the nozzle present the aerodynamic profile as claimed in claim 1.

13. The turbine nozzle as claimed in claim 12, including 155 to 175 vanes that present the aerodynamic profile.

14. The turbine nozzle as claimed in claim 12, including 165 vanes that present the aerodynamic profile.

* * * * *